(12) United States Patent
Cho et al.

(10) Patent No.: US 12,332,134 B2
(45) Date of Patent: Jun. 17, 2025

(54) METHOD FOR DETERMINING BOLTING TORQUE

(71) Applicant: LG ENERGY SOLUTION, LTD., Seoul (KR)

(72) Inventors: Jun Beom Cho, Daejeon (KR); Heung Kun Park, Daejeon (KR); Choon Kwon Kang, Daejeon (KR); Min Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 350 days.

(21) Appl. No.: 17/790,814

(22) PCT Filed: Sep. 1, 2021

(86) PCT No.: PCT/KR2021/011777
§ 371 (c)(1),
(2) Date: Jul. 5, 2022

(87) PCT Pub. No.: WO2022/050692
PCT Pub. Date: Mar. 10, 2022

(65) Prior Publication Data
US 2023/0022323 A1    Jan. 26, 2023

(30) Foreign Application Priority Data

Sep. 4, 2020  (KR) .................. 10-2020-0113240

(51) Int. Cl.
| | |
|---|---|
| G01L 5/24 | (2006.01) |
| F16B 31/02 | (2006.01) |
| G01B 5/24 | (2006.01) |
| G01L 3/14 | (2006.01) |
| G01L 25/00 | (2006.01) |

(52) U.S. Cl.
CPC .............. *G01L 5/24* (2013.01); *G01L 3/1464* (2013.01); *F16B 31/02* (2013.01); *G01B 5/24* (2013.01); *G01L 25/003* (2013.01); *Y02E 60/10* (2013.01)

(58) Field of Classification Search
CPC ....... G01L 5/24; G01L 25/003; G01L 3/1464; G01B 5/24; F16B 31/02; Y02E 60/10
See application file for complete search history.

(56) References Cited

U.S. PATENT DOCUMENTS

| 5,131,130 A | 7/1992 | Eshghy |
| 2006/0218768 A1 | 10/2006 | Makimae et al. |

(Continued)

FOREIGN PATENT DOCUMENTS

| CN | 107830964 A | 3/2018 |
| CN | 108760531 A | 11/2018 |

(Continued)

OTHER PUBLICATIONS

International Search Report for PCT/KR2021/011777 mailed on Nov. 8, 2021.

(Continued)

*Primary Examiner* — Lisa M Caputo
*Assistant Examiner* — Christian T Bryant
(74) *Attorney, Agent, or Firm* — Birch, Stewart, Kolasch & Birch, LLP (57) ABSTRACT

Disclosed is a bolting torque determination method which includes a preparation process of preparing samples of an object and samples of a bolt, a sample fracture torque acquisition process of measuring and acquiring a sample fracture torque, an effective fastening torque zone determination process of determining an effective fastening torque zone, in which fastening is performed without fracture, a bolt fastening angle measurement process of performing test (Continued)

fastening on the samples according to each of the plurality of selected experimental torques and measuring bolt fastening angles, and a bolting torque determination process of determining a bolting torque, whereby a rotation angle of each of the sample bolts is measured from a predetermined reference point of time to a point of time when the test fastening is finished.

13 Claims, 3 Drawing Sheets

(56) References Cited

U.S. PATENT DOCUMENTS

| | | |
|---|---|---|
| 2018/0165804 A1 | 6/2018 | Sakakibara et al. |
| 2020/0122279 A1 | 4/2020 | Miyago et al. |
| 2021/0046621 A1 | 2/2021 | Park et al. |

FOREIGN PATENT DOCUMENTS

| | | |
|---|---|---|
| JP | 2000-158355 A | 6/2000 |
| JP | 2002-39885 A | 2/2002 |
| JP | 2004-101246 A | 4/2004 |
| JP | 4255756 B2 | 4/2009 |
| JP | 2009-274152 A | 11/2009 |
| JP | 2013-108883 A | 6/2013 |
| JP | 6536550 B2 | 7/2019 |
| JP | 2020-66068 A | 4/2020 |
| KR | 10-2009-0015359 A | 2/2009 |
| KR | 10-2014-0141385 A | 12/2014 |
| KR | 10-2020-0092783 A | 8/2020 |

OTHER PUBLICATIONS

Extended European Search Report for European Application No. 21864651.1, dated Jul. 10, 2023.

METHOD FOR DETERMINING BOLTING TORQUE

TECHNICAL FIELD

The present invention relates to a bolting torque determination method and, more specifically, to a bolting torque determination method capable of accurately determining a bolting torque to enhance bolting quality.

BACKGROUND ART

Secondary batteries (hereinafter, referred to as 'batteries') are used as energy sources in various fields of large scale devices such as electric automobiles and energy storage systems as well as portable electronic devices such as smart phones, laptop computers, and tablet PCs. Among these fields, in fields such as electric automobiles and smart grid systems in which batteries are utilized a lot recently, there are many cases in which large capacities are required.

There may be a method of increasing a capacity of a battery cell itself in order to increase the capacity of the battery, but in this case, the effect of increasing the capacity is not large, the expansion of the battery size is physically limited, and the management is inconvenient. Accordingly, medium or large-sized battery packs, in which a plurality of battery cells are electrically connected, have been used.

Such a battery pack may include an outer housing which is separated from a battery pack case and able to protect the plurality of battery cells from external impact, and the battery pack case may be fixed to the inside of the outer housing.

In the related art, the battery pack case is fixed to the outer housing in a bolt fastening (hereinafter, referred to as 'bolting') method in which a torque wrench, a nut runner, or the like is used. Here, a bolting torque applied to a bolt when bolting is arbitrarily selected within a certain torque zone (hereinafter, referred to as a 'fastening torque zone') typically less than a fracture torque. Here, the selection of the bolting torque is dependent on the experience of a worker.

However, in this method, as the fracture torque increases, torque deviations within the fastening torque zone also increases. That is, since the selection of the worker becomes wider as the fracture torque increases, it is difficult for the worker to determine the bolting torque empirically.

Also, the fastening force required for bolting may change depending on the conditions of bolting, such as dimensional precision, surface roughness, and a lubrication state of the bolt, the outer housing, and the battery pack case. However, it is difficult for the worker to accurately consider the above conditions each time while performing the bolting a plurality of times, and thus, the worker may not obtain a desired fracture torque even if tightening the bolt with the bolting torque empirically determined on the basis of the fracture torque. That is, the fastening may be performed deficiently or excessively when the bolting, and thus, the quality level of the bolting is not uniform.

The background art of the invention is disclosed in the following patent documents.

(Patent Document 1) KR 10-2020-0092783 A (Patent Document 2) JP 2009-274152 A

DISCLOSURE OF THE INVENTION

Technical Problem

The present invention provides a bolting torque determination method capable of accurately determining a bolting torque to enhance bolting quality.

Technical Solution

A bolting torque determination method according to an exemplary embodiment of the present invention includes: a preparation process of preparing samples of an object and samples of a bolt which are to be bolted; a sample fracture torque acquisition process of measuring and acquiring a sample fracture torque at which at least one of the samples of the object and the bolt is fractured when the samples of the object and the bolt are bolted; an effective fastening torque zone determination process of determining an effective fastening torque zone, in which fastening is performed without fracture, on the basis of the sample fracture torque; an experimental torque selection process of selecting a plurality of experimental torques within the effective fastening torque zone; a bolt fastening angle measurement process of performing test fastening on the samples according to each of the plurality of selected experimental torques and measuring bolt fastening angles; and a bolting torque determination process of determining a bolting torque, which is to be used for bolting of the object and the bolt among the plurality of experimental torques, on the basis of the plurality of measured bolt fastening angles, wherein, in the bolting fastening angle measurement process, a rotation angle of each of the sample bolts is measured from a predetermined reference point of time to a point of time when the test fastening is finished.

The reference point of time is a point of time when a force applied to the sample bolt during the test fastening increases and exceeds a torque that corresponds to a lower certain percent (%) of the experimental torque.

The reference point of time is a point of time when the force applied to the sample bolt during the test fastening increases and exceeds the lower 40% of the experimental torque.

The reference point of time is a point of time when a force applied to the sample bolt during the test fastening is converted from a rotational force to a fastening force.

The reference point of time is a point of time when an electric current value and revolutions per minute of a bolting apparatus change sharply during the test fastening, wherein the bolting apparatus rotates the sample bolt so that the sample bolt is bolted to the sample object.

The reference point of time is a point of time when a head of the sample bolt comes into contact with the sample object during the test fastening.

In the effective fastening torque zone determination process, when a first torque less than the sample fracture torque is set to a lower limit, and a second torque between the first torque and the sample fracture torque is set to an upper limit, a range from the first torque to the second torque is determined as the effective fastening torque zone.

In the effective fastening torque zone determination process, a range from 60% to 80% of the sample fracture torque is determined as the effective fastening torque zone.

In the experimental torque selection process, a difference between two consecutive experimental torques is set to a certain size, and the plurality of experimental torques are selected in sequence within the effective fastening torque zone.

The plurality of experimental torques include at least one of the lower limit or the upper limit of the effective fastening torque zone.

The bolt fastening angle measurement process includes: an experimental torque assignment process in which the plurality of experimental torques are respectively assigned to a plurality of bolting apparatuses that perform the test fastening on the samples; and a sample bolting process in which the sample bolts are respectively bolted to the sample objects by the plurality of bolting apparatuses to which the experimental torques are assigned, wherein a rotation angle of each of the sample bolts is measured during the sample bolting process.

The bolt fastening angle measurement process includes: an experimental torque assignment process in which the lowest value to the highest value of the plurality of experimental torques or the highest value to the lowest value are sequentially assigned to a bolting apparatus that performs the test fastening on the samples; and a sample bolting process in which the plurality of sample bolts are respectively bolted to the plurality of sample objects by the bolting apparatus in the order in which the experimental torques are assigned, wherein a rotation angle of each of the sample bolts is measured during the sample bolting process.

The bolting torque determination process includes: a bolt fastening angle sorting process in which the measured bolt fastening angles are compared to a predetermined reference bolt angle to sort out bolt fastening angles less than the reference bolt angle; and an experimental torque sorting process in which, when one sorted bolt fastening angle is present, the experimental torque in the test fastening that measures the corresponding bolt fastening angle is sorted out, or when a plurality of sorted bolt fastening angles are present, an average value thereof is calculated, the lowest bolt fastening angle with a standard deviation of less than 3 with respect to the average value is checked, and the experimental torque in the test fastening that measures the corresponding bolt fastening angle is sorted out, wherein the experimental torque sorted out in the experimental torque sorting process is determined as the bolting torque.

The reference bolt angle is 30 degrees.

Advantageous Effects

According to the exemplary embodiment of the present invention, the test fastening is performed according to the plurality of experimental torques selected within the fastening torque zone, and the results thereof are used to finally determine the bolting torque, and thus, the accurate bolting torque, in which the deviation in materials between the object and the bolt to be bolted is reflected, may be determined.

Thus, since a worker determines arbitrarily and directly the bolting torque within the fastening torque zone, the bolting torque may be determined accurately compared to the related art in which only the fracture torque is reflected in the bolting torque. Accordingly, when the bolting is performed on the object and the bolt, the sufficient fastening force may be provided to tighten the bolt. Thus, the bolt may be prevented from being fastened loosely and excessively, and the quality level of the bolting may be uniformly maintained.

MODE FOR CARRYING OUT THE INVENTION

Hereinafter, embodiments of the present invention will be described in detail with reference to the accompanying drawings. The present invention may, however, be embodied in different forms and should not be construed as limited to the embodiments set forth herein. Rather, the embodiments of the present invention are provided so that this disclosure will be thorough and complete, and will fully convey the scope of the present invention to those skilled in the art. The drawings may be exaggeratedly illustrated so as to describe the embodiment of the present invention, parts irrelevant to the description will be omitted from the drawings, and like reference numerals in the drawings refer to like elements.

Hereinafter, an embodiment of the present invention will be described with reference to the drawings.

Figure 1:
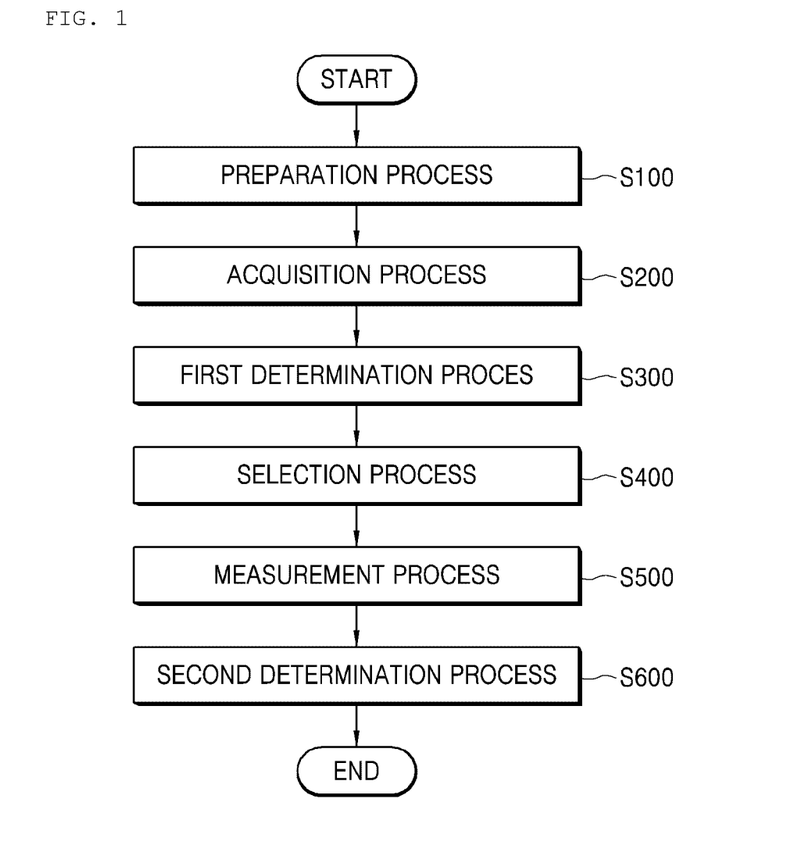
FIG. 1 is a flowchart schematically showing a bolting torque determination method according to an embodiment of the present invention.
Figure 2:
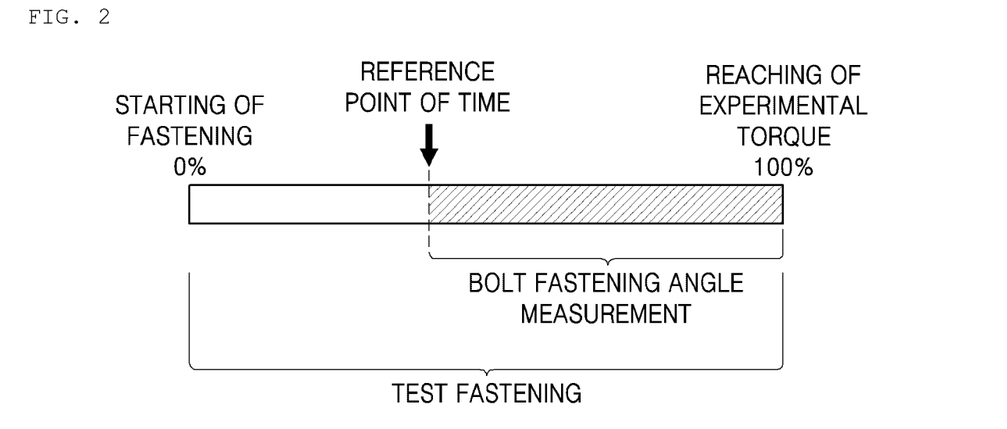
FIG. 2 is a conceptual view for describing a bolt fastening angle, an experimental torque, and a reference point of time according to an embodiment of the present invention.
Figure 3:
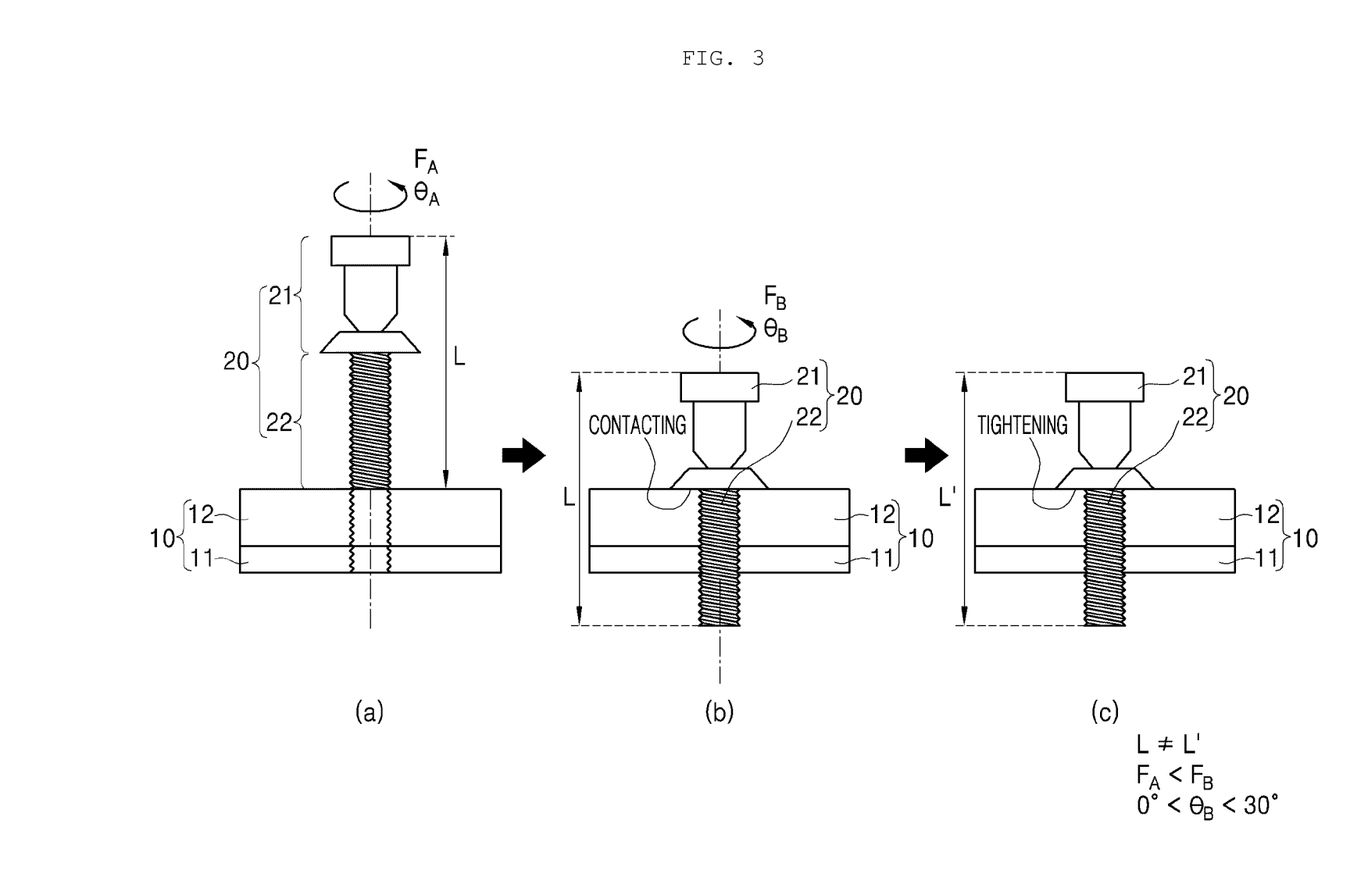
FIG. 3 is a schematic view for describing a measurement process according to an embodiment of the present invention.

1. Bolting Torque Determination Method According to an Embodiment of the Present Invention FIG. 1 is a flowchart schematically showing a bolting torque determination method according to an embodiment of the present invention. FIG. 2 is a conceptual view for describing a bolt fastening angle, an experimental torque, and a reference point of time according to an embodiment of the present invention. (a) to (c) of FIG. 3 are schematic views for describing a measurement process according to an embodiment of the present invention.

The bolting torque determination method according to an embodiment of the present invention will be described in detail with reference to FIGS. 1 to 3.

Referring to FIG. 1, the bolting torque determination method according to an embodiment of the present invention may include the following processes.

1.1. Preparation Process (S100)

The preparation process (S100) is a process of preparing samples of an object and samples of a bolt which are to be bolted. Here, the samples may include a plurality of sample objects 10 and a plurality of sample bolts 20. The numbers of the plurality of sample objects 10 and the plurality of sample bolts 20 may be prepared based on the number of times of test fastening which will be described later. That is, when the test fastening is performed three times, three sample objects 10 and three sample bolts 20 may be prepared.

Of course, each of the numbers of the sample objects 10 and the sample bolts 20 may be greater than the number of times of the test fastening. For example, even if the test fastening is performed three times, three or more sample objects 10 and three or more sample bolts 20 may be respectively prepared for an acquisition process which will be described later.

Referring to FIG. 3, the sample objects 10 may be certain plate members which include the same materials and have the same thicknesses as objects to be bolted. For example, each of the sample objects 10 may include a lower plate 11 and an upper plate 12. The lower plate 11 and the upper plate 12 are stacked vertically, and a fastening hole is formed to pass through these plates in the up-down direction.

The object to be bolted may be a battery pack. The lower plate 11 may include a material of the battery pack case and may have the same thickness as the battery pack case. Also, the upper plate 12 may include a material of an outer housing and may have the same thickness as the outer housing. Of course, the types of the objects to be bolted may be varied in addition to the battery pack case, and accordingly, the materials and thicknesses of the lower plate 11 and the upper plate 12 may also be varied.

The sample bolts 20 may be bolts which are the same types as bolts to be used to assemble the battery pack case and the outer housing when the battery pack is manufactured. Each of the sample bolts 20 may include a head 21 and a screw part 22. The head 21 may extend in the up-down direction, and may have an upper portion formed in a nut shape or may have a driver groove formed in a top surface so as to be connected to a bolting apparatus which is to actually perform test fastening of the samples and a bolting operation of the object and the bolt. The screw part 22 may be formed in a round bar shape and extend downward from the head 21, and screw threads may be formed on the outer circumferential surface thereof. Of course, the sample bolt 20 may have various structures.

The bolting apparatus may use, for example, electric tools such as a nut runner and a torque wrench. When a bolting torque is input, the bolting apparatus may axially rotate the sample bolt 20 and the bolt at the bolting torque, thereby tightening the sample bolt 20 and the bolt to the sample object 10 and the object. Also, the bolting apparatus may be provided with an electronic angle gauge. While the sample bolt 20 and the bolt are axially rotated and tightened, the bolting apparatus may use the electronic angle gauge to measure a rotation angle (hereinafter, referred to as a 'bolt fastening angle') of the sample bolt 20 and the actual bolt from a desired point of time until when the bolting is completed, and then provide the rotation angle to the worker through a screen. Of course, the bolting apparatus may have various configurations and methods.

1.2. Sample Fracture Torque Acquisition Process (S200)

Referring to FIG. 1, the sample fracture torque acquisition process (S200) is a process of measuring and acquiring a sample fracture torque at which at least one of the samples of the object and the bolt is fractured when the samples of the object and the bolt are bolted. That is, the sample fracture torque may be a certain torque at which at least one of the sample object 10 and the sample bolt 20 may be broken when the sample object 10 and the sample bolt 20 are bolted by applying a torque to the sample bolt 20. For example, the sample fracture torque may be a torque applied to the sample bolt 20 when stress formed in the sample bolt 20 on bolting is equivalent to the yield stress of the sample bolt 20, or may be a torque applied to the sample bolt 20 when stress formed in the sample object 10 on bolting is equivalent to the yield stress of the sample object 10.

The sample fracture torque may be experimentally acquired from a torque which is applied to the sample bolt 20 at the moment at least one of the sample bolt 20 and the sample object 10 is broken by bolting these components until one of these components is broken, or may be theoretically calculated based on the material properties and shape of the sample bolt 20 and the material properties and shape of the sample object 10.

1.3. Effective Fastening Torque Zone Determination Process (S300)

The effective fastening torque zone determination process (S300) is a process of determining an effective fastening torque zone, in which the samples are fastened without fracture, on the basis of the sample fracture torque. In the process, when a first torque less than the sample fracture torque is set to a lower limit, and a second torque between the first torque and the sample fracture torque is set to an upper limit, a range from the first torque to the second torque is determined as the effective fastening torque zone.

The effective fastening torque may represent a torque which is applied to the bolt so as to obtain a fastening force required to fix the object and the bolt to each other, and the effective fastening torque zone may represent a range of the torque which is applied to the bolt so as to obtain the fastening force required to fix the object and the bolt to each other. Here, even when the plurality of identical objects are bolted by using the plurality of identical bolts, the fastening conditions of each bolt and each object, such as surface roughness, dimensional precision, and lubrication states may be slightly different from each other.

Thus, even when the same object and the same bolt are bolted by using the same tool at the same torque, fastening forces provided to the bolting results may be different from each other. Thus, in the embodiment of the present invention, the effective fastening torque zone is determined, the test fastening is performed on the basis of this zone, and the bolting torque is determined by using performance results of the test fastening. Accordingly, one bolting torque may be determined, which produces the smallest change in fastening force, for example, the best reproducibility when the bolting is repeated a plurality of times. That is, the bolting torque may be obtained, in which deviations of the fastening conditions probably occurring even between the plurality of bolting operations using the same types of bolt and object are reflected. Meanwhile, the bolting torque may represent a fastening torque which is to be finally used to perform bolting between an actual object and an actual bolt.

The effective fastening torque zone determination process (S300) will be described continuously.

The first torque may be a torque equivalent to 60% of the sample fracture torque, the second torque may be a torque equivalent to 80% of the sample fracture torque, and the range from 60% to 80% of the sample fracture torque may be determined as the effective fastening torque zone. That is, when the sample fracture torque is 100 kgf·cm, the effective fastening torque zone may be 60 to 80 kgf·cm. Also, when the sample fracture torque is 200 kgf·cm, the effective fastening torque zone may be 120 to 160 kgf·cm.

This range of the effective fastening torque zone shows the relationship between experimental torques and the fracture torque to determine the bolting torque, and bolting is performed at a torque less than the fracture torque so that the bolting is stably performed. When the bolting is performed at a torque much less than the fracture torque, the bolt may be tightened loosely. Also, when the bolting is performed at a torque very close to the fracture torque, an excessive tensile force is applied to the bolt, and a structure of the bolted portion may become easily unstable due to external impact. The range of the effective fastening torque zone may be acquired empirically from the worker.

For example, workers perform bolting at a certain torque selected within a range from X % to Y % of the fracture torque while repeating the bolting by using various objects and the bolts. When confirming that bolting quality is better than would otherwise be the case, the workers may determine that desired bolting quality may be ensured when selecting the torque within the range from X % to Y % of the fracture torque and performing the bolting at the selected torque. Accordingly, the effective fastening torque zone may be determined as the range from X % to Y % of the sample fracture torque. In an embodiment of the present invention, this effective fastening torque zone is determined as the range from 60% to 80% of the sample fracture torque.

For example, when the lower limit of the effective fastening torque zone is less than 60% of the sample fracture torque, test fastening may be performed at a torque less than 60% of the sample fracture torque during test fastening. Accordingly, in this test fastening, the fastening between the sample object 10 and the sample bolt 20 may be loosened.

Also, when the upper limit of the effective fastening torque zone is greater than 80% of the sample fracture torque, test fastening may be performed at a torque greater than 80% of the sample fracture torque during test fastening. Accordingly, in this test fastening, the sample bolt 20 may be excessively deformed, for example, elongated, and thus, a fastened section may be weak.

Of course, the effective fastening torque zone may be acquired from a certain model which models bolting structures of the bolt and the object.

1.4. Experimental Torque Selection Process (S400)

The experimental torque selection process (400) is a process of selecting a plurality of experimental torques within the effective fastening torque zone. This process may be performed in a manner in which a difference between two consecutive experimental torques is set to a certain size, and the plurality of experimental torques are selected in sequence within the effective fastening torque zone. That is, the plurality of experimental torques may be selected within the effective fastening torque zone so that the experimental torques are evenly distributed within the effective fastening torque zone. Here, the plurality of experimental torques may include at least one of the lower limit or the upper limit of the effective fastening torque zone.

For example, when the effective fastening torque zone is 60 to 80 kgf·cm, the torques of 60 kgf·cm, 70 kgf·cm, and 80 kgf·cm may be selected as the experimental torques. Of course, within the same zone, 60 kgf·cm, 65 kgf·cm, 70 kgf·cm, 75 kgf·cm, and 80 kgf·cm may be selected as the plurality of experimental torques.

1.5. Bolt Fastening Angle Measurement Process (S500)

The bolt fastening angle measurement process (S500) is a process of performing test fastening on the samples according to each of the plurality of experimental torques and measuring bolt fastening angles. Referring to FIG. 2, the measurement of a bolt fastening angle is performed for each test fastening, and torques from 0 to the experimental torque are sequentially applied to the sample bolt 20 when the fastening starts. When a predetermined reference point of time arrives after a certain time has passed, a rotation angle (referred to as a 'bolt fastening angle') of the sample bolt (20) may be measured from the predetermined reference point of time to a point of time when the test fastening is finished after the torque applied to the sample bolt 20 arrives at the experimental torque.

1.6. Definition and Meaning of the Reference Point of Time

Here, the reference point of time may be defined in a following way.

Referring to FIG. 2, the reference point of time may be defined as a point of time when a force applied to the sample bolt during the test fastening increases and exceeds a torque that corresponds to a lower certain percent (%) of the experimental torque. Particularly, the reference point of time may be a point of time when the force applied to the sample bolt during the test fastening increases and exceeds the lower 40% of the experimental torque.

The meaning of the reference point of time is as follows. Referring to (a) of FIG. 3, the reference point of time may be a point of time when the force applied to the sample bolt 20 during the test fastening is converted from a rotational force $F_A$ to a fastening force $F_B$.

For example, when the test fastening starts, the torque is applied to the sample bolt 20 while the torque increases from 0 to the experimental torque. Here, as in (a) and (b) of FIG. 3, the sample bolt 20 descends while rotating a certain angle $\theta_A$, and is then inserted into a hole of the sample object 10. After a certain time passes, the head 21 comes into contact with the sample object 10.

Here, the torque may change slowly until the head 21 of the sample bolt 20 comes into contact with the sample object 10. That is, only a small force may be used for the sample bolt 20 to enter the hole, and the sample bolt 20 may be lightly tightened to the sample object 10 while smoothly rotating the certain angle $\theta_A$ of about 360° or more. Here, the force applied to the sample bolt 20 may be referred to as the rotational force $F_A$.

Subsequently, after a point of time when the head 21 of the sample bolt 20 comes into contact with the sample object 10, the sample bolt 20 is forcibly rotated, and the sample bolt 20 is elastically deformed or plastically deformed. Accordingly, when the bolting is completed by firmly tightening the sample bolt 20 until the torque arrives at the experimental torque, the desired fastening force between the sample bolt 20 and the sample object 10 may be obtained. That is, as in (b) and (c) of FIG. 3, when the sample bolt 20 is rotated with a large force, the sample bolt 20 is firmly tightened to the sample object 10 while gradually rotates a certain angle $\theta_B$, and accordingly, the bolting may be completed. Here, the force applied to the sample bolt 20 may be referred to as the fastening force $F_B$. Here, in the drawing, L represents the length of the sample bolt 20 before deformation, and L' represents the length of the sample bolt 20 which has been elastically or plastically deformed.

That is, referring to the above description, the reference point of time may be a point of time when the head 21 of the sample bolt 20 comes into contact with the sample object 10 during the test fastening. Also, in other words, the reference point of time may be a point of time when an electric current value and revolutions per minute of a bolting apparatus (not shown), which rotates the sample bolt 20, change sharply during the test fastening. Particularly, during the test fastening, it may be a point of time when the electric current of the bolting apparatus begins to sharply increase, and the revolutions per minute begins to sharply decrease.

Meanwhile, when the sample bolt 20 rotates more than 30° while the fastening force is applied to the sample bolt 20, screw portions of the sample bolt and the sample object may be excessively plasticized, and the fastening force may not be increased even if the sample bolt 20 rotates continuously. Thus, until the bolting is completed after the point of time when the force applied to the sample bolt 20 is converted from the rotational force $F_A$ to the fastening force $F_B$, it is desirable that the rotation angle of the sample bolt 20 may be 30° or less during the test fastening.

1.7. Detailed Configuration of Bolt Fastening Angle Measurement Process (S500)

Hereinafter, the bolt fastening angle measurement process (S500) will be described continuously. The bolt fastening angle measurement process (S500) may include the following detailed processes.

A. Experimental Torque Assignment Process

First, the plurality of experimental torques may be respectively assigned to a plurality of bolting apparatuses that perform the test fastening on the samples. That is, when the plurality of trials of test fastening are simultaneously performed by using the plurality of bolting apparatuses, the plurality of experimental torques may be input to the plurality of bolting apparatuses, respectively.

Of course, the lowest value to the highest value of the plurality of experimental torques or the highest value to the lowest value may be sequentially assigned to a bolting apparatus that performs the test fastening on the samples. In this case, the plurality of trials of test fastening may be sequentially performed by using one bolting apparatus. Bolting processes, which will be described later, are performed respectively between assignment processes, and thus, the trials of test fastening may be performed sequentially.

B. Sample Bolting Process

Subsequently, when the trials of test fastening are simultaneously performed, the sample bolts 20 may be respectively bolted to the sample objects 10 by the plurality of bolting apparatuses to which the experimental torques are assigned. A rotation angle of each of the sample bolts 20 may be measured during this process. An angle gauge provided in the bolting apparatus may be used for the rotation angle of the sample bolt 20. Of course, in addition to the above, various tools may be used to measure the rotation angle.

Also, when the trials of test fastening are sequentially performed, the plurality of sample bolts are respectively bolted to the plurality of sample objects by the bolting apparatus in the order in which the experimental torques are assigned. During this process, a rotation angle of each of the sample bolts may be measured.

For example, when the experimental torques are torques of 60 kgf·cm, 70 kgf·cm, and 80 kgf·cm, the test fastening for a sample bolt 20 and a sample object 10 is performed first with the torque of 60 kgf·cm, and the bolt fastening angle may be measured from a point of time passing the torque of 24 kgf·cm until a point of time when the test fastening is finished. Next, the test fastening for a new sample bolt 20 and a new sample object 10 is performed with the torque of 70 kgf·cm, and the bolt fastening angle may be measured from a point of time passing the torque of 28 kgf·cm until a point of time when the corresponding test fastening is finished. Subsequently, the test fastening for the other sample bolt 20 and the other sample object 10 is performed with the torque of 80 kgf·cm, and the bolt fastening angle may be measured from a point of time passing the torque of 32 kgf·cm.

1.8. Bolting Torque Determination Process (S600)

The bolting torque determination process (S600) is a process of determining a bolting torque, which is to be used for bolting of the object and the bolt among the plurality of experimental torques, on the basis of the plurality of measured bolt fastening angles. Through this process, the bolting torque, which has good reproducibility in fastening forces on bolting, may be determined within the effective fastening torque zone.

The bolting torque determination process (S600) described above may include: a bolt fastening angle sorting process in which the measured bolt fastening angles are compared to a predetermined reference bolt angle to sort out bolt fastening angles less than the reference bolt angle; and an experimental torque sorting process in which, when one sorted bolt fastening angle is present, the experimental torque in the test fastening that measures the corresponding bolt fastening angle is sorted out, or when a plurality of sorted bolt fastening angles are present, an average value thereof is calculated, the lowest bolt fastening angle with a standard deviation of less than 3 with respect to the average value is checked, and the experimental torque in the test fastening that measures the corresponding bolt fastening angle is sorted out.

In the bolting torque sorting process, the predetermined reference bolt angle may be 30 degrees. Accordingly, through this process, the completed test fastening, that is, the test fastening in which the rotation of the sample bolt 20 is finished may be sorted out before the screw portions of the sample bolt 20 and the sample object 10 may be excessively plasticized.

In the experimental torque sorting process, the bolting torque may be obtained by using the experimental torque that corresponds to the sorted test fastening. Here, when one trial of sorted test fastening is present, the experimental torque, which has been used in the corresponding test fastening, is sorted out and determined as the bolting torque. When a plurality of sorted tests are present, the bolting torque should be determined among the plurality of experimental torques used in the plurality of trials of sorted test fastening. To this end, the average value of the sorted bolt fastening angles is calculated, and the standard deviation thereof with respect to the average value is computed. Also, the bolt fastening angles with the standard deviation of less than 3 are selected, and among them, the bolt fastening angle having the lowest value is checked. Accordingly, the experimental torque in the test fastening that measures the checked bolt fastening angle is sorted out, and this may be determined as the bolting torque. Through this process, the accurate bolting torque to be used in the bolting may be determined.

When the bolting torque is determined, operations of bolting actual objects and actual bolts at the bolting torque may be performed a plurality of times, and through this, a battery pack having excellent quality may be manufactured.

According to an exemplary embodiment of the present invention, the effective fastening torque zone may be determined on the basis of the fracture torque acquired from the samples of the object and the samples of the bolt which are to be bolted. The plurality of experimental torques may be selected within the effective fastening torque zone to respectively perform the test fastening, thereby measuring the bolt fastening angles after the reference point of time. The plurality of measured bolt fastening angles may be used to finally determine the bolting torque within the effective fastening torque zone. That is, in the embodiment of the present invention, through these processes, the accurate bolting torque, which accepts a change in the bolting conditions due to the deviation in materials between the object and the bolt to be bolted, may be determined.

The above embodiments of the present invention have been made for describing the present invention, but are not intended to limit the present invention. It should be noted that the configurations and methods disclosed in the embodiments of the present invention may be combined and modified into various forms by joining or crossing same, and these modified embodiments may also be considered within the scope of the present invention. That is, the present invention may be embodied in various forms within the scope of the claims and the technical ideas equivalents thereto, and it will be understood by those skilled in the art that various embodiments can be made within the scope of the technical ideas of the present invention.

DESCRIPTION OF THE SYMBOLS

10: Sample object
11: Lower plate
12: Upper plate
20: Sample bolt
21: Head
22: Screw part
$F_A$: Rotational force
$F_B$: Fastening force
L: Length of sample bolt

The invention claimed is:

1. A bolting torque determination method comprising:
a preparation process of preparing samples of an object and samples of a bolt which are to be respectively bolted;
a sample fracture torque acquisition process of measuring and acquiring a sample fracture torque at which at least one of the samples of the object and the samples of the bolt is fractured when the samples of the object and the samples of the bolt are respectively bolted;
an effective fastening torque zone determination process of determining an effective fastening torque zone, in which fastening of a sample object and a sample bolt is performed without fracture for the samples of the object and the samples of the bolt, on the basis of the sample fracture torque;
an experimental torque selection process of selecting a plurality of experimental torques within the effective fastening torque zone;
a bolt fastening angle measurement process of performing test fastening on the samples of the object and samples of the bolt according to each of the selected plurality of experimental torques and measuring bolt fastening angles; and
a bolting torque determination process of determining a bolting torque, which is to be used for bolting of an object and a bolt to be bolted among the plurality of experimental torques, on the basis of the measured bolt fastening angles,
wherein, in the bolt fastening angle measurement process, a rotation angle of each sample bolt is measured from a predetermined reference point of time to a point of time when the test fastening is finished, and
wherein the reference point of time is a point of time when a force applied to the sample bolt during the test fastening is changed from a rotational force to a fastening force.

2. The bolting torque determination method of claim 1, wherein the reference point of time is a point of time when a force applied to the sample bolt during the test fastening increases and exceeds a torque that corresponds to a lower certain percent (%) of the plurality of experimental torques.

3. The bolting torque determination method of claim 2, wherein the reference point of time is a point of time when the force applied to the sample bolt during the test fastening increases and exceeds the lower 40% of the experimental torque.

4. The bolting torque determination method of claim 2, wherein the bolting torque determination process comprises:
a bolt fastening angle sorting process in which the measured bolt fastening angles are compared to a predetermined reference bolt angle to sort out bolt fastening angles less than the reference bolt angle; and
an experimental torque sorting process in which, when one sorted bolt fastening angle is present, the experimental torque in the test fastening that measures the corresponding bolt fastening angle is sorted out, or when a plurality of sorted bolt fastening angles are present, an average value thereof is calculated, a lowest bolt fastening angle that has a standard deviation of less than 3 with respect to the average value is checked, and the experimental torque in the test fastening that measures a corresponding bolt fastening angle is sorted out,
wherein the experimental torque sorted out in the experimental torque sorting process is determined as the bolting torque.

5. The bolting torque determination method of claim 4, wherein the reference bolt angle is 30 degrees.

6. The bolting torque determination method of claim 1, wherein the reference point of time is a point of time when an electric current value and revolutions per minute of a bolting apparatus change to a higher value during the test fastening, and
wherein the bolting apparatus rotates the sample bolt so that the sample bolt is bolted to the sample object.

7. The bolting torque determination method of claim 1, wherein the reference point of time is a point of time when a head of the sample bolt comes into contact with the sample object during the test fastening.

8. The bolting torque determination method of claim 1, wherein, in the effective fastening torque zone determination process, when a first torque less than the sample fracture torque is set to a lower limit, and a second torque between the first torque and the sample fracture torque is set to an upper limit, a range from the first torque to the second torque is determined as the effective fastening torque zone.

9. The bolting torque determination method of claim 8, wherein, in the effective fastening torque zone determination process, a range from 60% to 80% of the sample fracture torque is determined as the effective fastening torque zone.

10. The bolting torque determination method of claim 8, wherein the plurality of experimental torques comprise at least one of the lower limit or the upper limit of the effective fastening torque zone.

11. The bolting torque determination method of claim 1, wherein, in the experimental torque selection process, a difference between two consecutive experimental torques is set to a certain size, and the plurality of experimental torques are selected in sequence within the effective fastening torque zone.

12. The bolting torque determination method of claim 1, wherein the bolt fastening angle measurement process comprises:
an experimental torque assignment process in which the plurality of experimental torques are respectively assigned to a plurality of bolting apparatuses that perform the test fastening on the samples of the bolt; and
a sample bolting process in which the samples of the bolt are respectively bolted to the samples of the object by the plurality of bolting apparatuses to which the experimental torques are assigned,
wherein the rotation angle of each of the samples of the bolt is measured during the sample bolting process.

13. The bolting torque determination method of claim 1, wherein the bolt fastening angle measurement process comprises:
an experimental torque assignment process in which a lowest value to a highest value of the plurality of experimental torques or the highest value to the lowest value of the plurality of experimental torques are sequentially assigned to a bolting apparatus that performs the test fastening on the samples of the bolt and the samples of the object; and a sample bolting process in which the sample of the bolts are respectively bolted to the samples of the object by the bolting apparatus in the order in which the experimental torques are assigned, wherein the rotation angle of each of the samples of the bolts is measured during the sample bolting process.

* * * * *